United States Patent [19]

Hansen

[11] Patent Number: 5,625,380
[45] Date of Patent: Apr. 29, 1997

[54] METHOD AND CIRCUIT FOR GENERATING AN ACTIVATION SIGNAL AND USES FOR THE SAME

[75] Inventor: John P. Hansen, Kildehusvej 51, DK-40000 Roskilde, Denmark

[73] Assignee: John Paulin Hansen, Roskilde, Denmark

[21] Appl. No.: 385,545

[22] Filed: Feb. 8, 1995

[51] Int. Cl.$^6$ ................................................ G09G 5/08
[52] U.S. Cl. ........................................ 345/157; 345/158
[58] Field of Search .............................. 345/157, 158, 345/145, 146, 156; 358/335

[56] References Cited

U.S. PATENT DOCUMENTS

| 4,109,145 | 8/1978 | Graf | 345/146 |
|---|---|---|---|
| 4,979,047 | 12/1990 | Wine | 358/335 |
| 5,204,703 | 4/1993 | Hutchinson et al. | |
| 5,285,265 | 2/1994 | Choi | 358/335 |

OTHER PUBLICATIONS

"What you look at is what you get," IEEE Computer Society, Jul. 1993, Robert J. K. Jacob, pp. 65–66.
"Computers that sense eye position on the display," IEEE Computer Society, Thomas E. Hutchinson, Jul. 1993, pp. 65 and 67.

*Primary Examiner*—Richard Hjerpe
*Assistant Examiner*—Regina Liang
*Attorney, Agent, or Firm*—Finnegan, Henderson, Farabow, Garrett & Dunner, L.L.P.

[57] ABSTRACT

In systems, such as graphic screens where activation of functions takes place by means of initiation signals, a certain period of time normally elapses from the initiation signal to the implementation of the given function. By providing an indication of the span of time from the moment when the initiation signal is applied and until it actually activates the function, a user-friendly function activation can be established in an easy and clear manner, the user having constant control of the amount of time left until the function is activated. Additionally, the user may either provide a regret signal in the time between the function activation and the initiation signal, or provide an accelerated function activation. This time is variable, so that it can be adapted to various users, such as handicapped, experienced or unexpedienced users. The indicator is usually designed as a graphic picture, e.g. in the form of an eye which slowly closes form the moment an initiation signal is applied and until the function is actually performed. In the event that the user regrets, the eye instantaneously opens completely, while the user, e.g. by a rapid blink of the eye, can activate the function instantaneously. The system may be used in connection with keyboards having pushbutton keys, with mouse activation and with various techniques using eye movement recording.

21 Claims, 5 Drawing Sheets

5,625,380

METHOD AND CIRCUIT FOR GENERATING AN ACTIVATION SIGNAL AND USES FOR THE SAME

BACKGROUND OF THE INVENTION

The invention concerns a method and a circuit for generating an activation signal after a predetermined period of time, which is initiated by an initiating signal, and uses of the method and the circuit.

DESCRIPTION OF RELATED ART

It is generally known, e.g. in connection with graphic display screens, to use a so-called mouse which, when moved about on a substrate, moves a cursor around on the graphic screen to position the cursor in an icon on the graphic screen. When the cursor is positioned in the icon, a button on the mouse may be activated to thereby implement the associated function.

A more recent graphic activation system of the eye movement recording type operates in principle like the above-mentioned activation system with a mouse.

Such an activation system is known from e.g. two articles in IEEE Computer Society, July 1993, Robert J. K. Jacob, "What you look at is what you get", pages 65 and 66, and Thomas E. Hutchinson, "Computers that sense eye position on the display", pages 65 and 67. Reference can also be made to U.S. Pat. No. 5,204,703, Thomas E. Hutchinson et al.

These known activation systems operate in that a user looks at a screen having graphic symbols, so-called icons, as is known in mouse-activated systems. The user orients himself on the screen by means of a camera which is used for determining the position of the point at which the user looks. The position is "transferred" via a computer, and when the position is in an icon, a function may be activated. With respect to the mouse-activation where the function is activated by pressing a button on the mouse, the function in the eye mark technique is usually activated in one of two ways. One is to insert a fixed time delay, so that when the user has "captured" an icon, a certain period of time elapses before it is activated. The other is to use a button on a keyboard to confirm that the function associated with the icon, at which the user 10 looks, can be activated.

Of these two options, the most attractive one is undoubtedly the first comprising provision of a time delay before a function is activated. Particularly in connection with systems where it is desired to activate functions from graphic displays present behind e.g. a shop window, it is an advantage that no buttons requiring physical activation have to be presented to a user.

Likewise, it is an advantage to severely handicapped persons if physical activation of a button can be avoided, in particular for persons who are so severely handicapped that they can almost just move their eyes.

One might imagine that it would take a longer time to get used to the eye mark technique than to the mouse activation technique, because it is quite unusual for people to use their eyes for anything but observation. However, it has been found that after some use persons can get just as familiar with a graphic display screen as with the use of a mouse. It has moreover been found that the use of a mouse for an extended period of time may be a severe strain on hands and arms.

As a person gets familiar with a graphic display screen, the required length of the delay time diminishes. A long delay time may be a downright nuisance and may be felt "endless", partly because there is no clear feeling of the amount of time left, partly because the eye may be accidentally moved from the icon, making it necessary to start from scratch again. Thus, it is desirable i.a. to provide a system which shows to the user the time that elapses from the activation of the icon until the associated function is performed.

It should also be noted that in case of traditional keyboards, e.g. a keyboard coupled to a conventional PC, it may sometimes be desirable that, at least for some keys, it takes a certain time from the key is activated until it actually implements a function.

SUMMARY OF THE INVENTION

The object of the invention is thus to provide a method which allows for various users' familiarity and/or experience with activation systems. This is obtained according to the invention in that an indicator shows the residual time before the activation signal is optionally applied, and that a regret facility excluding the activation signal can be provided in the predetermined period of time or that a facility for accelerated application of the activation signal can be provided in the predetermined period of time.

The user hereby gets a safer feeling since the user can constantly see the span of time from initiation of a function until its actual performance. Further, it is an advantage that the user may regret his selection, which is particularly advantageous if the user has activated a wrong function by mistake. The alternative embodiment provides the supplementary advantage that the activation signal can be provided quickly, which may be an advantage in particular for experienced users, and still with full control of the max. span of time left before the function is performed.

It is expedient that the period of time is variable.

This is particularly advantageous, since the users frequently have very different needs for system response time. For example, experienced users usually want a shorter time than inexperienced users.

The invention also concerns a circuit designed to generate an activation signal in a predetermined period of time after the circuit has received an initiation signal. This circuit is characterized in that it contains an indicator to show the residual time before the activation signal is optionally provided, and that the circuit in the predetermined period of time is designed to apply a regret signal which excludes the activation signal or that the circuit is adopted to apply an accelerated activation signal in the predetermined period of time.

Thus, a circuit having the same advantages as the above-mentioned method is provided.

Expediently, the circuit is characterized in that the indicator displays a graphic symbol, such as in the form of an eye, which closes gradually from a completely open, to a partly open and to a completely closed state during the predetermined period of time, depending on whether the activation signal is to be provided, a regret signal possibly provided in the predetermined of time causing the eye to return to the completely open state.

This provides a very pleasant indication of the time from when a function is provided and until it is actually performed, it being very clear to see the amount of time left before the eye closes.

A circuit and a method as described above have many applications. For instance, these may be used in a large number of electronic displays. For instance, microscopes or camera equipment may conceivably be operated by the eye mark technique at the edge of the search field. The eye mark technique may also be used in public information systems, e.g. at railway stations or motorway pull-ins, where vandalism or wear on mouse and pushbuttons can be avoided by replacing them with vision fixation recording equipment (Graphic display screen) which, together with the screen, can be positioned behind unbreakable glass. A special field of use is dispensers to which physical contact is made difficult or impossible. Drive-in cash dispensers can be operated without the customer having to park his car at a maximum distance of an arm's length from the dispenser, and without the customer being exposed to the climatic discomfort involved at certain periods of the year by sitting in a car with the window down for an extended period of time. In connection with banking systems, the eye mark technique may moreover be used in combination with an iris recognition system for personal identification purposes instead of using a PIN code, thereby making it impossible for other persons in the vicinity to discover any access code.

It should also be noted that the above-mentioned circuit with eye indicators lends itself for use by severely disabled persons, since, almost no matter how handicapped a person is, he will almost always be able to move his eyes. It is hereby possible to get in contact with even completely paralysed persons via a graphic service system. Expedient uses of the method and the circuit are defined herein.

BRIEF DESCRIPTION OF THE DRAWINGS

The invention will be explained more fully below with reference to a preferred embodiment shown in the drawing, in which.

DESCRIPTION OF PREFERRED EMBODIMENT

Figure 1:
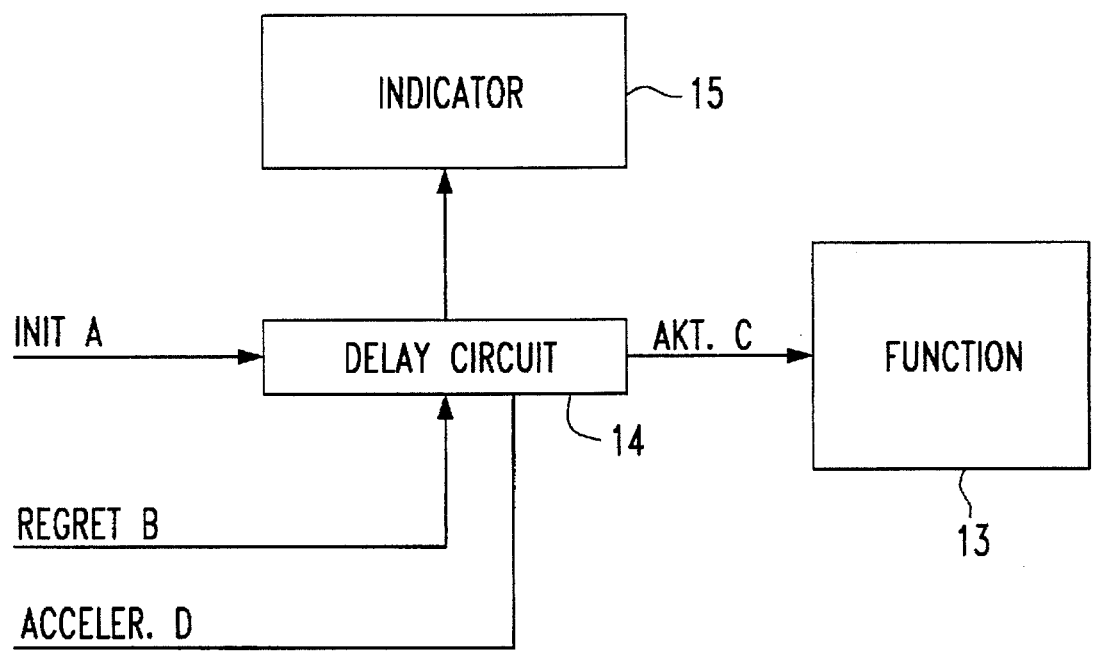
FIG. 1 is a block diagram showing the principles of generating an activation signal according to the invention.

FIG. 1 shows that a signal A can initiate a delay circuit 14. In addition to this signal A, a regret signal B may be supplied to the delay circuit 14, and an indicator 15 shows the span of time left before an activation signal C is applied to a function circuit 13. Optionally, an accelerated activation signal C may be provided by a signal D. The indicator 15 may be designed in many ways, e.g. as a door that closes, if it is desired to activate a function to get out of the selected function.

Figure 2:
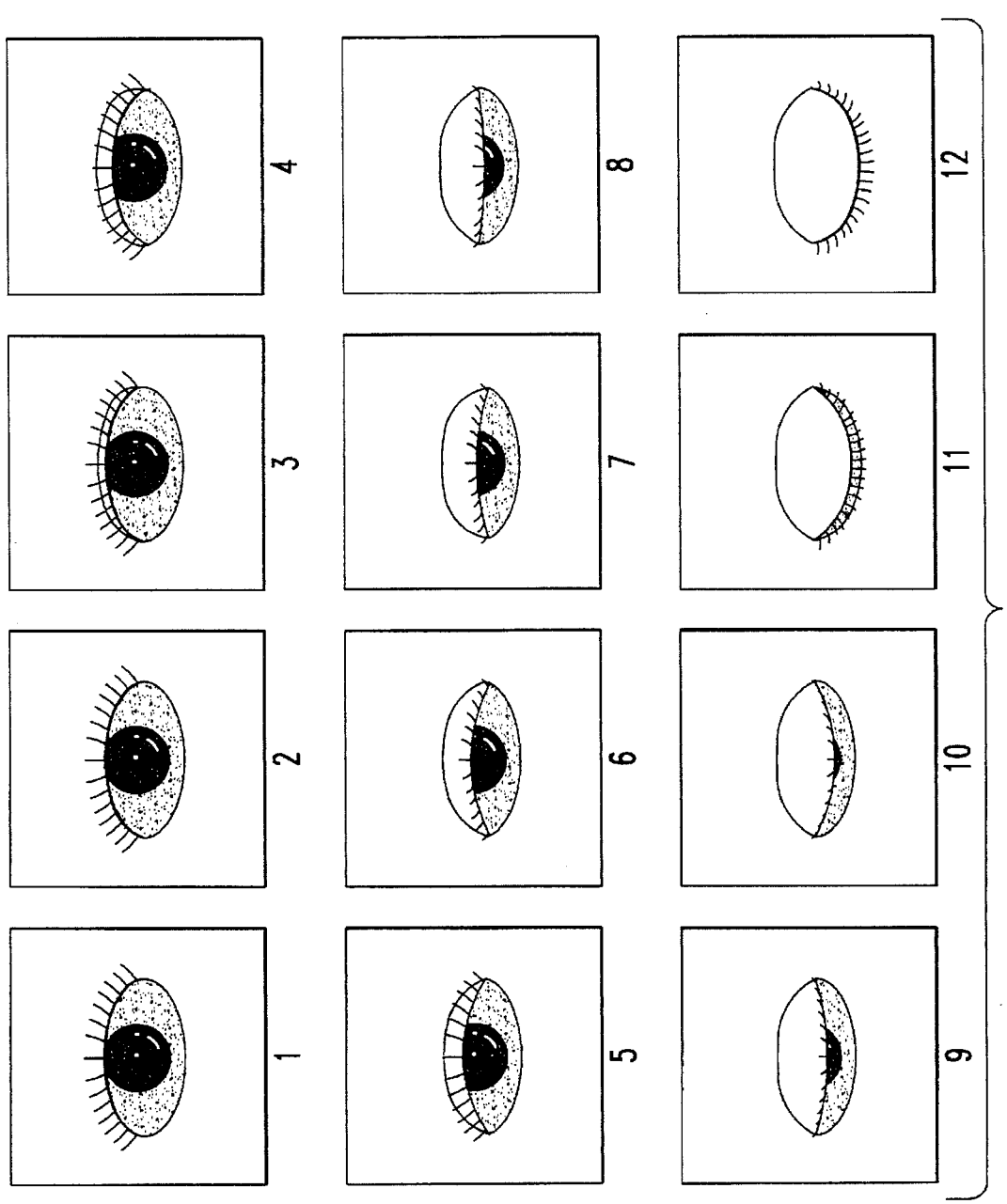
FIG. 2 shows an example of an indication of the residual time from when a signal is initiated until the signal causes activation of a function.

As shown in FIG. 2, the indicator may also be a symbol in the form of an eye, which goes through a number of sequences designated 1–12 in the figure. Thus, it will be seen that when changing from 1 to 2, corresponding to an initiation signal, the edge shadowing changes at the transition from position 1 to position 2. Then the eye undergoes various changes in state, closing slowly in the course from position 2 to position 12, where it is closed completely, which means that the function will be activated if position 12 is reached. The circuit of the invention is now designed such that if a user, having initiated at 1, e.g. wishes to regret at 3, 4 or 5, the user merely provides a regret signal, following which the eye is instantaneously returned to the starting position 1, and the function will thus not be performed. If the user wants an accelerated activation signal, the user merely provides a signal D which is different from the signal B.

Figure 3:
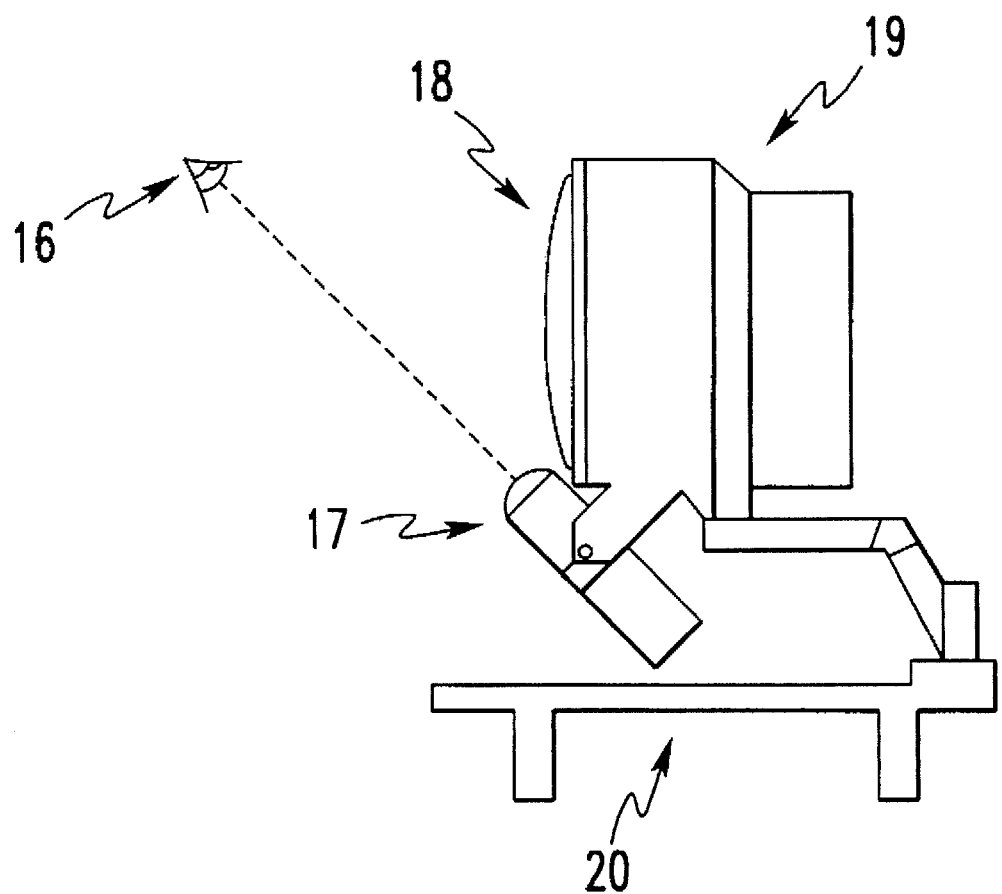
FIG. 3 shows an example of an eye recording device for use in the performance of the invention.

FIG. 3 shows an example of a setup that may be used in the implementation of the invention. 19 designates a video monitor having a screen 18 and a computer (not shown) which is mounted on a frame 20. A camera 17, e.g. an IR camera, capable of transmitting light up to a user's eye is provided on the video monitor. Light from the eye is reflected to the camera 17, which, via the computer, registers the point on the screen 18 at which the user looks. If the camera 17 is in a position where a user looks at an icon having a symbol for activation of a function, it is now possible to provide a signal A to initiate the circuit according to the invention, and as long as the user focuses on the selected icon on the display unit, the eye in the icon begins to close, and as soon as it has closed completely, a function can be activated. If the user looks away from the field before the eye has closed, a regret signal B is provided, instantaneously causing the icon on the screen to return to the starting position. If the user wants an accelerated activation signal D, this may e.g. be done in that the user blinks his eye while focusing on the icon.

Figure 4A:
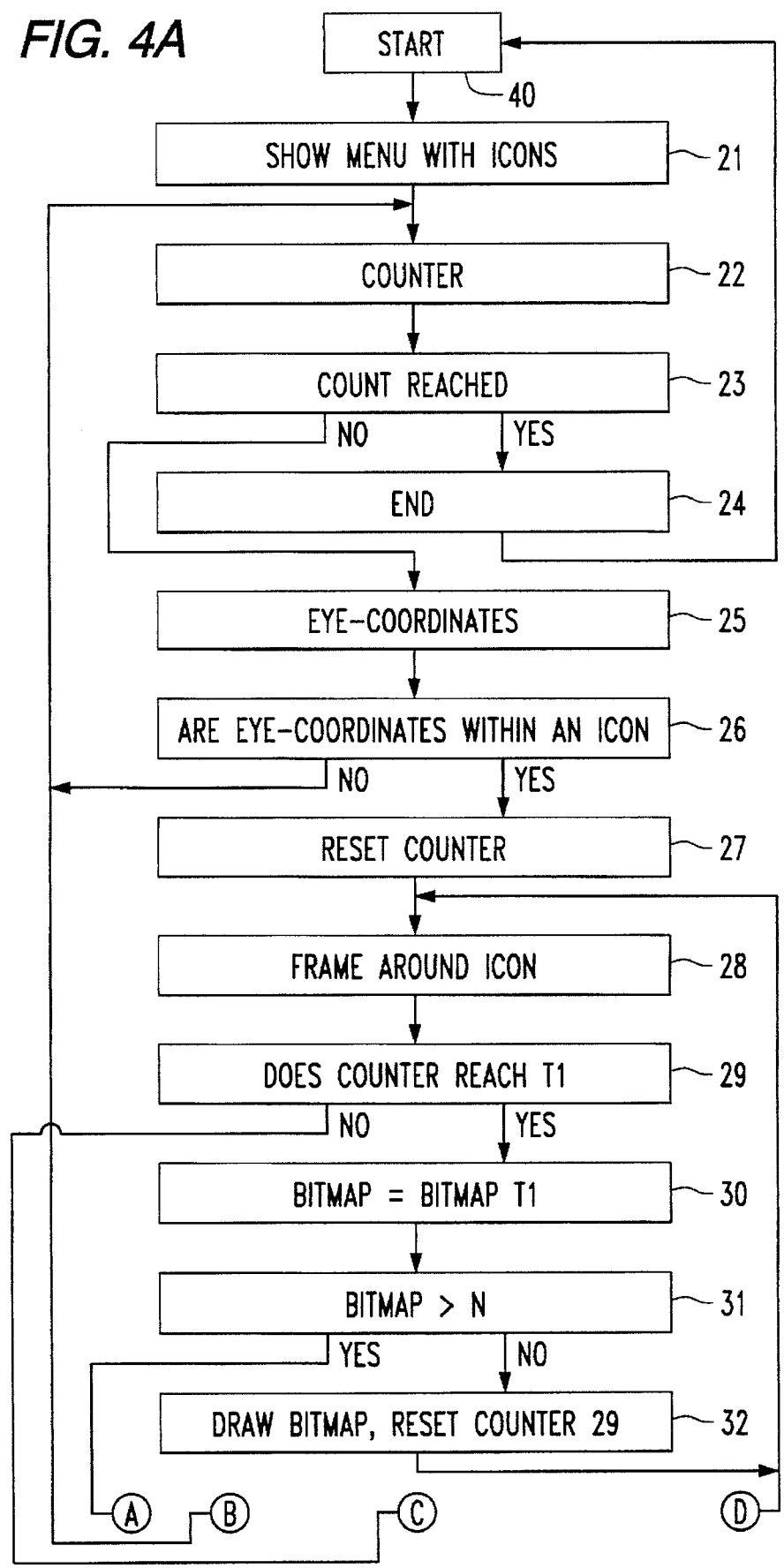
FIGS. 4A and 4B show a block diagram of an embodiment of the invention.
Figure 4B:
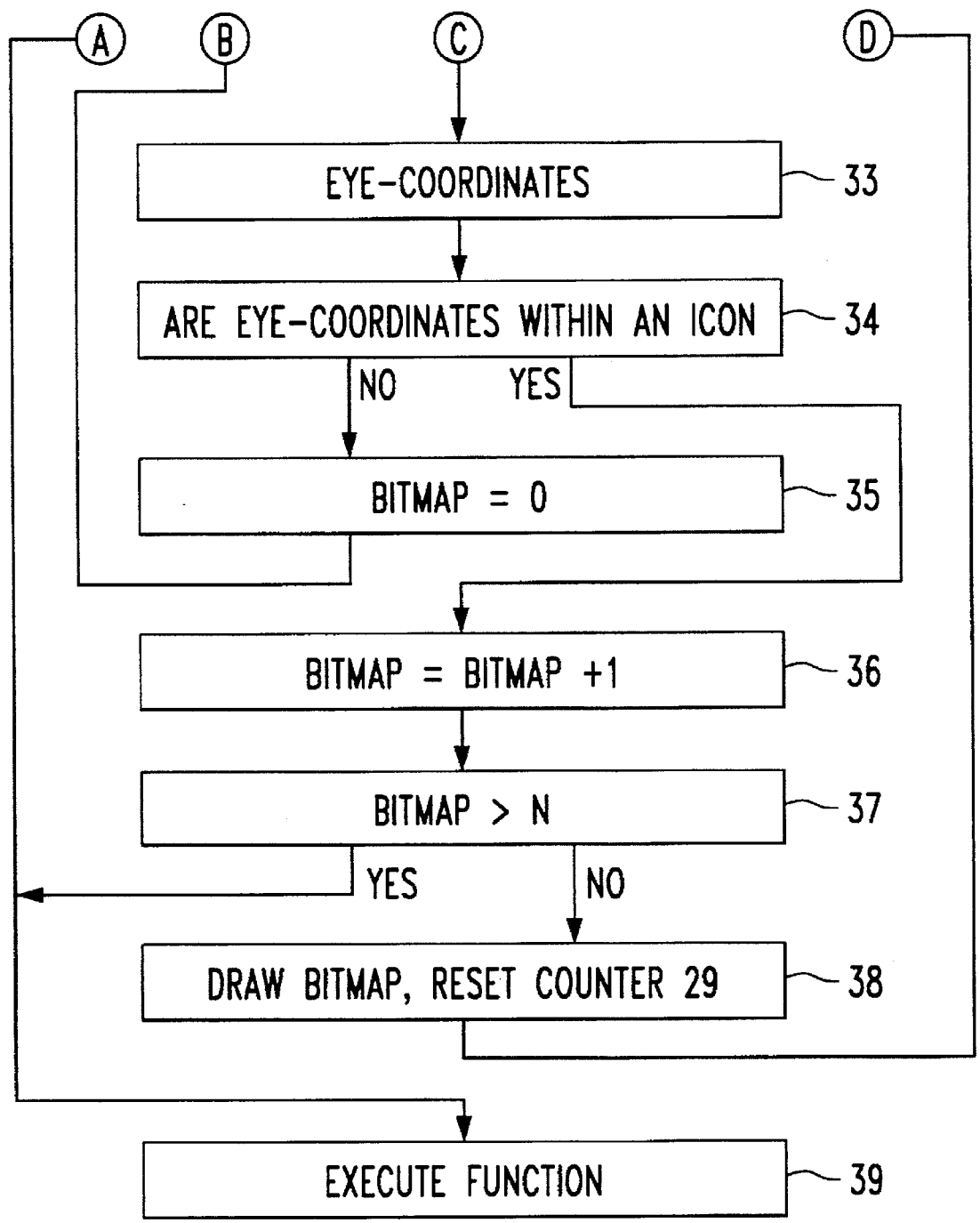

FIGS. 4A and 4B, which are to be seen in combination, it being contemplated that they are interconnected by the letters, A, B, C, d, show an example of the implementation of the invention in connection with the embodiment of FIG. 3. 21 shows the starting position with a menu activated at start 40 that contains icons, as is well-known in connection with traditional graphic display screens. However, it should be stressed that the usual "cursor", which can be seen on the graphic display screen in connection with mouse-activated systems, is preferably not shown on the screen, but nothing prevents it from being present, which may be practical when training the use of the system. A counter starts in 22, corresponding to a predetermined period of time. If the camera 17, cf. FIG. 3, before the expiry of the predetermined period of time, which is determined in 23, records a positional change, the eye coordinates concerned are in an icon, and if yes, the counter is reset in 27. A no results in return to the starting position in 22. 28 prepares for an "image series" consisting of N so-called bit maps, the first bit map in the icon being provided with a frame. At the same time, another counter is started in 29 to measure the time $t_1$. If, within the time $t_1$, the camera 17 records that the position of the eye drops out of the eye, a jump is made to 33, cf. FIG. 4B, and from there to 34, in which it is determined whether the eye co-ordinates now given are in an icon or outside. A no in 34 results in a jump back to 22, where the process starts from scratch. A yes in 34 results in a switch in 36 to the next image corresponding to a new bit map. It is decided in 37 whether N image sequences (N bit maps) have been shown, and if yes, a function may be performed in 39. A no results in the drawing of a new image 38 to 28, where the process starts again, and if no expiry is detected in the other counter in 29, the function will be activated after N runs, while in case of expiry in the counter 29, corresponding to the previously mentioned regret signal, the process starts again from scratch in 30, whether the Nth image (bit map) is drawn. Then, it is decided in 31 whether the Nth image has been reached, and a yes results in a jump to 39, where a function is preferred, while a no results in a jump back to 28.

Of course, though the invention has been explained in connection with recording equipment where the movements of a person's eye are used for activating a function, nothing prevents the method and the circuit of the invention to be employed in connection with a mouse or a keyboard, or even with a facility for switching between various types of recording equipment.

When the keys of a keyboard are used, the keys may e.g. be provided with a pressure field downwardly and a graphic symbol upwardly.

What is claimed is:

1. A method of performing a function at the end of a predetermined time period in response to the generation of an activation signal, said method comprising:
   generating a time initiation signal;
   initiating the predetermined time period for performing the function in response to the initiation signal;
   excluding the generation of the activation signal at times when an externally applied regret signal is activated;
   accelerating the generation of the activation signal at times when an externally applied acceleration signal is activated;
   indicating the time remaining in the predetermined time period for performing the function, said step of indicating including the substeps of:
   activating the regret signal at times when the regret signal is applied during the time remaining in said time period, and
   activating the acceleration signal at times when the acceleration signal is applied during the time remaining in the predetermined time period; and
   generating the activation signal for performing the function, during said predetermined time period in response to the activation of the applied acceleration signal or the step of indicating zero time remaining in the predetermined time period, whichever is first to occur, at times when the regret signal remains inactive during said predetermined time period prior to the activation of the acceleration signal.

2. A method according to claim 1, wherein the step of initiating the predetermined time period includes varying the initiated predetermined time period.

3. A method according to claim 1 wherein the function performed at the end of a predetermined time period in response to the generation of an activation signal comprises operation a keyboard having pushbutton keys.

4. A method according to claim 1 wherein the indicating mean includes a display unit with a graphic screen.

5. A method according to claim 1 wherein performing the function includes initiating the time period in response to iris recognition of an iris recognition system.

6. A method according to claim 1 wherein performing the function comprises operating an access control system for buildings including buiding system functions.

7. A method according to claim 1 wherein performing the function comprises placing of commercial orders through show windows.

8. A method according to claim 1 wherein performing the function comprises operating entertainment devices selected from any one of the group consisting of gambling machines, video systems, and computer systems.

9. A method according to claim 1 wherein performing the function comprises operating a TV set by remote control including voice recognition.

10. A method according to claim 1 wherein performing the function comprises operating a dispensing machine for food or any other produce on in any kind of dispensing products and services from any one of the group consisting of general merchandise both edible and non edible, cash and automatic transfer transactions.

11. A circuit for performing a function at the end of a predetermined time period in response to the generation of an activation signal, comprising:
   means for applying an initiation signal to initiate said predetermined time period for performing the function;
   means for excluding the generation of the activation signal at times when an externally applied regret signal is activated;
   means for accelerating the generation of the activation signal at times when an externally applied acceleration signal is activated; and
   indicating means responsive to the initiation of the predetermined time period for determining the time remaining in said predetermined time period for performing the function, said indicating means including
   means for activating the regret signal at times when the regret signal is applied during the time remaining in said time period, and
   means for activating the acceleration signal at times when the acceleration signal is applied during the time remaining in the predetermined time period; and
   means for generating the activation signal for performing the function during said predetermined time period in response to the activation of the applied acceleration signal or zero time remaining in the predetermined time period, whichever is first to occur, at times when the regret signal remains inactive during said predetermined time period prior to the activation of the applied acceleration signal.

12. A circuit according to claim 11, wherein the predetermined time period is variable.

13. A circuit according to claim 12, wherein the indicator indicates a graphic symbol in the form of an eye, said eye closes from a completely open state, to a partly open state, and to a completely closed state during the predetermined time period in the absence of the activated reget signal, the presence of said activated regret signal in the predetermined time period causing the eye to return to the completely open state.

14. A circuit according to claim 11 wherein the performance of a function comprises operating a keyboard having pushbutton keys.

15. A circuit according to claim 11 wherein the indicating means includes a display unit with a graphic screen.

16. A circuit according to claim 11 wherein the initiation signal is responsive to iris recognition in an iris recognition system.

17. A circuit according to claim 11 wherein the performed function is operating an access control system for buildings including building system functions.

18. A circuit according to claim 11 wherein the performed function is placing commercial orders through show windows.

19. A circuit according to claim 11 wherein the performed function is operating entertainment devices selected from any one of the group consisting of gambling machines, video systems, and computer systems.

20. A circuit according to claim 11 wherein the performed function is for remotely operating a TV set, including remote operation by voice recognition.

21. A circuit according to claim 11 wherein the performed function is for operating a dispensing machine for dispensing products and services from any one of the group consisting of general merchandise both edible and non edible, cash and automatic transfer transactions.

* * * * *

UNITED STATES PATENT AND TRADEMARK OFFICE
CERTIFICATE OF CORRECTION

PATENT NO. : 5,625,380
DATED : April 29, 1997
INVENTOR(S) : John P. Hansen

It is certified that error appears in the above-indentified patent and that said Letters Patent is hereby corrected as shown below:

Abstract, front page, line 16, change "form" (second occurrence) to --from--.

Claim 3, column 5, line 43, change "operation" to --operating--.

Claim 6, column 5, line 51, change "buiding" to --building--.

Signed and Sealed this

Twenty-sixth Day of August, 1997

Attest:

BRUCE LEHMAN

Attesting Officer

Commissioner of Patents and Trademarks